United States Patent Office 3,340,230
Patented Sept. 5, 1967

3,340,230
POLYMERIZATION OF BIS-(α-HALOALKYL) AROMATIC COMPOUNDS
John M. Hoyt, Cincinnati, Ohio, assignor to National Distillers and Chemical Corporation, New York, N.Y., a corporation of Virginia
No Drawing. Filed Apr. 3, 1964, Ser. No. 357,279
17 Claims. (Cl. 260—47)

This invention relates to a new and improved process for the preparation of poly(arylenedialkylene)polymers. More specifically, the invention pertains to the polymerization of bis-(α-haloalkyl)aromatic compounds to obtain polymeric products containing recurring units comprised of the aromatic and alkylene substituents.

It is already known in the art to prepare simple poly(arylenedimethylene)polymers, such as poly(phenylenedimethylene) or poly(p-xylylene), by pyrolyzing p-xylene vapors at very high temperatures and short contact times. M. Szwarc, Nature, 160, 403 (1947); Faraday Soc. Discussions, 2, 46 (1947); J. Chem. Phys., 16, 128 (1948); J. Polymer Sci., 6,319 (1951). British Patents 650,947 and 673,651. Various p-xylene analogs, such as 2-chloro-p-xylene, 2-fluoro-p-xylene, 1,4-dimethylnaphthalene and 2,5 - dimethylpyrazine have also been converted to the corresponding polymers by the pyrolysis method. It is also known in the art to prepare poly(p-xylylene) and related polymers by Hofmann degradation procedures comprising the dry pyrolysis of certain trimethyl(o-and p-methylbenzyl) ammonium hydroxides (U.S. Patent No. 2,757,146) and the decomposition of the hydroxides or the related quaternary halide salts in a boiling 5 N aqueous solution of an alkali metal hydroxide (U.S. Patent No. 2,999,820).

Poly(arylenedimethylenes) of this general type have also been prepared from the corresponding bis-(α-halomethyl) aromatic compounds such as α,α'-dichloro-p-xylene or α,α'-dibromo-p-xylene by using such highly-reactive coupling agents as metallic sodium (R. A. Jacobson, J. Am. Chem. Soc., 54, 1513 (1932)); sodium-potassium alloy or metallic lithium (J. Golden, J. Chem. Soc., 1604 (1961)); and metallic magnesium (R. A. Jacobson, supra); W. Carothers, Chem. Rev., 8, 353 (1931); and lithium alkyls (J. Golden, supra). The reaction of metallic magnesium with o- and p-chloro-methylbenzyl methyl ethers yields the corresponding o- and p-xylylene polymers (F. G. Mann and F. H. C. Stewart, J. Chem. Soc., 2826 (1954)).

Recently, poly(arylenedimethylene)polymers have been prepared by reacting certain dialkylaromatic compounds with peroxides (V. V. Korshak, S. L. Sosin and V. P. Alekseeva, J. Polymer Sci., 52, 213 (1961)). For example, p-diisopropylbenzene is converted to poly-(α,α,α',α'-tetramethyl-p-xylylene) by heating with two moles of di-tert-butyl peroxide.

The various polymerization processes heretofore proposed in the prior art have been found to suffer from a number of serious disadvantages. For one thing, the selection of starting materials in the pyrolytic process is somewhat limited, beacuse many substituents would readily decompose under the drastic conditions for making phenylene-dimethylene polymers where temperatures of the order of 800 to 1300° C. are required, for example, in the pyrolysis of xylene-type hydrocarbons. It is also disclosed in the art that only para-phenylenedimethylene polymers can be produced by the pyrolytic method from xylene-type hydrocarbons. The pyrolysis of o-xylene does not yield a polymer product apparently because of side reactions leading to anthracene derivatives. Undesirable side reactions, which would limit yields and the molecular weight of the products, are also encountered when the highly reactive coupling agents such as sodium, lithium, magnesium, sodium-potassium alloy, and lithium alkyls are used for the polymerization of bis-(α-haloalkyl) aromatic compounds having sensitive substituents as hereinafter disclosed.

As is known to the art, the pyrolytic method of producing phenylenedimethylene polymers invariably yields a more or less crosslinked insoluble, intractable polymeric product, which greatly restricts its use in practical applications, such as the production of molded articles, fibers, films, etc. Certain recent improvements are known to the art in which p-xylylene monomers, produced by the pyrolysis of the corresponding aromatic hydrocarbons and trapped in cold solvents, on polymerizing to completion at temperatures below about −45° C., yield polymers of improved moldability (U.S. Patent 3,084,-146). However, such procedures suffer from the disadvantages of the pyrolytic method of monomer synthesis, i.e., poor yields and extreme pyrolysis temperatures (800°–1300° C.), and present serious technical problems attendant on the use of extremely low temperatures of polymerization and low monomer concentrations.

One object of the present invention is to provide a polymerization method which avoids the difficulties and/or limitations of the prior art processes.

Another object of the present invention is to provide an improved polymerization process for the preparation of poly(arylenedialkylene)polymers.

A further object of the present invention is to provide a process for the polymerization bis-(α-haloalkyl) aromatic compounds under comparatively mild reaction condiitons.

A still further object of the present invention is to provide poly(arylenedialkylene)polymers, having excellent physical and chemical properties, which can be commercially utilized for the production of fibers, films and molded objects.

These and other objects of this invention will become more readily apparent from the ensuing description and illustrative embodiments.

In accordance with the present invention it has now been found that bis-(α-haloalkyl)aromatic compounds can be polymerized, in slurry or in solution, to the corresponding poly(arylenedialkylene)polymers at atmospheric pressures and at temperatures less than about 300° C. in the presence of a lower valent transition metal salt. More specific operating conditions include a reaction temperature within the range of about −30° to 300° C., preferably about 0° to 100° C.; and pressures which may range from about 1 to 1000 p.s.i.a., preferably from about 15 to 100 p.s.i.a. For most purposes, it is preferred to carry out the polymerization reaction in an inert atmosphere to avoid oxidation of the lower valent transition metal salt. Illustrative inert gases include nitrogen, argon, methane, helium, mixtures theerof, and the like.

In general, the lower valent transition metals are divalent chromium, divalent vanadium and trivalent titanium; the use of divalent chromium salts is preferred. It was also found preferable to employ a transition metal salt with an anion of a strong acid, i.e., an acid which in 1/10 N aqueous solution has a pH of less than about 2. Such anions include the sulfate, chloride, the phosphate and the like. The use of the sulfate anion $(SO_4^{-2})$ was found to be preferred for the purposes of this invention, and for purposes of illustration the invention will be described more particularly hereinafter in connection with the use of chromous sulfate as the lower valent transition metal salt. Although the foregoing transition metals have been found to be especially useful in carrying out the polymerization process of this invention, other possible lower valent transition metals may be selected from the group consisting of hafnium, zirconium, columbium, tantalum, molybdenum, tungsten, manganese, iron, ruthenium, osmium, cobalt, rhodium, iridium, nickel, palladium, platinum and copper. In accordance with another feature of this invention it has been found helpful to employ the transition metal salt in the form of a solution. The preferred solvents are hydroxylic in nature and include, for example, water, methanol, ethanol, n-propanol, isopropanol, ethylene glycol, and the like. The criteria for the solvent are that it be hydroxylic in nature and be capable of solvating the lower valent transition metal salt. The use of water as the transition metal salt solvent is especially preferred.

In general, the concentration of the lower valent transition metal salt in the reaction mixture will be within the range of about 0.05 to 4 moles, and preferably about 0.1 to 1 mole per liter of reaction mixture.

As previously noted, the starting material for the polymerization process of this invention is a bis-($\alpha$-haloalkyl) aromatic compound. It has been found useful to employ bis-($\alpha$-haloalkyl)aromatic compounds wherein the aromatic substituent is derived from an arene such as benzene, xylene, durene, etc.; a heterocyclic such as thiophene, furan, etc.; or a fused ring aromatic such as naphthalene, anthracene, tetralin, indane, quinoline, isoquinoline, etc. The polymerization of bis-($\alpha$-haloalkyl)arenes by the process of this invention is especially preferred. Although the haloalkyl groups may be present at various positions on the aromatic substituent, it is preferred to have them located in the ortho and para positions to each other. The halogen of the $\alpha$-haloalkyl substituent is selected from the group consisting of chloride, bromide, iodide, fluoride, as well as mixtures thereof. The alkylene portion of the $\alpha$-haloalkyl substituents, on the other hand, may contain about 1 to 20 carbon atoms and may either be straight or branched chain. However, for most purposes the alkylene portion will contain from about 1 to 8 carbon atoms.

In general, the structural formula for the starting material will be

$$X-CR_1R_2-Ar-CR_3R_4-X'$$

wherein:

X and X' are chlorine, bromine, fluorine or iodine, and the X and X' may be the same or different.

$R_1$, $R_2$, $R_3$ and $R_4$ are fluorine, hydrogen, or lower alkyl groups having from 1 to 3 carbon atoms, either straight or branched chain, or aryl groups having from 6 to 10 carbon atoms, and the R substituents may either be the same or different.

Ar is the aromatic substituent which is defined above, and the Ar substituent may be further substituted on the ring, and in various positions, with chlorine, bromine, iodine, fluorine, cyano, nitro, carboxy or carboalkoxy groups, alkyl groups having from 1 to 20 carbon atoms, or alkoxy groups having from 1 to 20 carbon atoms. It will be understood that these groups may also be either straight or branched chain.

By utilizing such starting material the polymers prepared in accordance with the process of this invention will contain the following recurring units

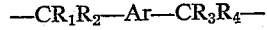
$$-CR_1R_2-Ar-CR_3R_4-$$

with the various substituents as above defined.

For the purposes of a more complete description, the following is a list of bis-($\alpha$-haloalkyl)aromatic compounds which can be effectively employed in the process of this invention:

$\alpha,\alpha'$-dichloro-p-xylene
$\alpha,\alpha'$-dibromo-o-xylene
$\alpha,\alpha'$-difluoro-p-xylene
1,4-bis-($\alpha$-chloroisopropyl)benzene
2,5-bis-(chloromethyl)-p-xylene
$\alpha,\alpha'$-dichloro-2-nitro-p-xylene
$\alpha,\alpha'$-dichloro-2,5-dicyano-p-xylene
$\alpha,\alpha'$-dichloro-4-carbomethoxy-o-xylene
$\alpha,\alpha'$-dichloro-$\alpha,\alpha'$-diphenyl-p-xylene
2,5-bis-(chloromethyl)-1,4-dimethoxybenzene
4,5-bis-(chloromethyl)-1,2-dimethoxybenzene
4,5-bis-(chloromethyl)-o-xylene
$\alpha,\alpha'$-2,3,5,6-hexachloro-p-xylene
1,4-bis-(difluorochloromethyl)-2,3,5,6-tetrafluorobenzene
1,2-bis-(difluorochloromethyl)-2,3,5,6-tetrachlorobenzene
1,4-bis-(chloromethyl)naphthalene
5,8-bis-(chloromethyl)tetralin
5,6-bis-(chloromethyl)indane
bis-(chloromethyl)durene
1,4-dibromo-1,2,3,4-tetrahydronaphthalene
1,4-dichloro-1,4-dihydronaphthalene
1,3-dichloroindane
2,5-bis-(chloromethyl)thiophene
2,5-bis-(chloromethyl)furan
5,8-bis(chloromethyl)quinoline
5,8-bis-(chloromethyl)isoquinoline
5,6-bis-(chloromethyl)quinoline
6,7-bis-(chloromethyl)-4-chloroquinoline
9,10-bis-(chloromethyl)anthracene
9,10-bis-(chloromethyl)-1-methylanthracene
9,10-bis-(chloromethyl)phenanthrene In general, it has been found desirable to employ the starting compound with a solvent therefor. The essential requirements of this solvent is that it dissolve the bis-($\alpha$-haloalkyl)aromatic compound, and that is be partially or, even more desirable, completely miscible with the coupling agent composition comprising the hydroxylic solvent and the lower valent transition metal salt. Examples of such solvents are methanol, acetone, p-dioxane, tetrahydrofuran, and the like. The amount of this solvent employed may vary over a wide range, and it will be understood that only enough solvent need be employed which will dissolve the bis-($\alpha$-haloalkyl)aromatic compound.

Other reaction conditions, not necessarily critical or essential, include a concentration of the bis-($\alpha$-haloalkyl)-aromatic compound in the reaction mixture which ranges from about 0.025 to 2 moles, preferably about 0.05 to 0.5 mole per liter of reaction mixture. Although the reaction will proceed without agitation, some degree of agitation or stirring during the reaction has been found helpful. Also, the order of addition of the materials to the reaction zone may be varied especially at the lower reaction temperatures; in general, however, the bis-($\alpha$-haloalkyl)aromatic compound solution is added to the lower valent transition metal salt solution. It will also be understood that the addition of the bis-($\alpha$-haloalkyl)-aromatic compound solution may either be at one time or in increments throughout the reaction period. Preferably, the solution of the starting material is added over a period which may extend from about 3 seconds to about 1 hour.

In accordance with one method of carrying out the polymerization process of this invention a bis-($\alpha$-halomethyl)aromatic compound, for example, $\alpha,\alpha$-dichloro-p-xylene, is dissolved in a suitable solvent, such as acetone, and is added over a period of a few seconds to one hour to a well-stirred solution of a transition metal salt of lower valence, for example, chromous sulfate, in a hydroxylic solvent, such as water, so that there is an amount 10 to 25% excess over 1 mole $CrSO_4$ per equivalent of benzylic chlorine in the said bis-($\alpha$-halomethyl)aromatic compound, and heated to a temperature of 60° to 80° C. under an inert atmosphere such as nitrogen. The resulting mixture is then heated and stirred for 1 to 3 hours at a temperature of 60° to 80° C. The poly-(p-xylylene) produced in the reaction is recovered by diluting the reaction mixture with water and filtering. The chromium salts present are easily washed out of the polymer with water or a 5% aqueous hydrochloric acid solution. Any unreacted $\alpha,\alpha$-dichloro-p-xylene remaining in the poly(p-xylylene), as well as any low molecular weight reaction products, are readily removed by extraction with acetone in a Soxhlet apparatus. The poly(p-xylylene) is then dried in vacuum.

Alternatively, the solution of the bis-($\alpha$-halomethyl) aromatic compound may be added to the solution of the transition metal salt of lower valence in a hydroxylic solvent at room temperature, and the resulting mixture may then be stirred at room temperature for a period of 1 to 24 hours, followed by isolation of the polymer as described above, or the mixture, after stirring for a time at room temperatures, may then be heated to a temperature of 60° to 80° C., and subsequently heated and stirred at that temperature for an additional period of from 1 to 3 hours, before isolating the polymeric product in the manner described above.

For economic reasons, the industrial production of poly(arylenedialkylene) polymers by the process of this invention must be carried out as a cyclic process in which the transition metal salts used as coupling agents for the bis-($\alpha$-chloroalkyl)aromatic compounds, as well as the halogen values derived from these latter compounds, are continuously recycled. One possible cyclic process involves the production of the poly(arylenedimethylene) polymer, e.g., poly(p-xylylene) from p-xylene, air, hydrogen and recycled HCl; and the production of related substituted poly(arylenedimethylene) polymers such as poly-(2,5-dimethyl-p-xylylene) or poly(2,5-dimethoxy-p-xylene), from formaldehyde and recycled HCl and p-xylene or 1,4-dimethoxybenzene, respectively.

More specifically, if it is desired to produce poly(p-xylylene), p-xylene and chlorine are reacted in a chlorination reactor, the chlorine coming partly from make-up chlorine but mainly from the burning of recovered recycled HCl. Chlorinated p-xylenes are separated by distillation where the mono-chlorinated product, $\alpha$-chloro-p-xylene, is recycled to the chlorination zone, products containing more than 2 chlorine atoms per molecule are rejected and the required $\alpha,\alpha'$-chloro-p-xylene is sent to the dissolver for dissolution, prior to polymerization, in a solvent such as acetone.

It is equally possible, as indicated above, to prepare certain other bis-($\alpha$-haloalkyl)aromatic compounds, such as, for example, 2,5-bis(chloromethyl)-p-xylene or 2,5-bis(chloromethyl-1,4-dimethoxybenzene, by chloroalkylation reactions known to the art, from p-xylene and 1,4-dimethoxybenzene, respectively, and formaldehyde, using some make-up HCl, but mainly recycled HCl, in the chloroalkylation reaction. These latter bis-($\alpha$-haloalkyl) aromatic compounds are then sent to the dissolver for eventual homopolymerization.

From the dissolver the solution of the bis-($\alpha$-haloalkyl)aromatic compound or compounds goes to the polymerization reactor together with an aqueous solution of the lower valence transition metal salt, for example, chromous sulfate.

The polymeriaztion occurs under an inert atmosphere, for example $N_2$. After polymerization the polymer is recovered from the reaction mixture by dilution with water and filtration. The crude polymer, which contains nearly all the low molecular weight products and unreacted bis-($\alpha$-haloalkyl)aromatic compound or compounds is extracted with a suitable solvent such as acetone. Extraction is followed by a second filtration step and then by drying in a suitable drier to yield finished polymer. The recovered extraction solvent is returned to solvent recovery from the filter and drier, and the purified extraction solvent is returned to storage while low molecular solid products and unreacted monomer are wasted, or in some cases the unreacted bis-($\alpha$-haloalkyl)aromatic compound is also recycled back to the dissolver or storage.

The spent chromium filtrate is collected. This liquor contains the solvent used for dissolving the bis($\alpha$-haloalkyl)aromatic compound prior to polymeriaztion, as well as an aqueous solution of the transition metal salts in the higher valence state attained as a result of the coupling-polymerization reaction. The solvent is stripped from the aqueous solution and returned to solvent storage.

At this point the spent aqueous solution of $CrCl_3$ and $Cr_2(SO_4)_3$ is diluted with water and passed through an anion exchange resin in the chloride form, whereby the sulfate anions are exchanged for chloride, so that pure chromic trichloride solution emerges.

When the anion exchange resin is completely converted to the sulfate form it can be used for the subsequent conversion of the chromous chloride solution to the sulfate form described below. The chromic trichloride solution is now evaporated in an evaporator until substantially all the chromium trichloride separates as the hexahydrate, whereupon it is rendered anhydrous by heating in a drier under an atmosphere of chlorine, hydrogen chloride, thionyl chloride, or carbon tetrachloride by a process known to the art. Additional purification of the anhydrous chromic chloride can be achieved by sublimation. At this point the anhydrous chromium trichloride passes to a reduction furnace where it is treated with hydrogen to produce substantially pure chromous chloride and dry gaseous HCl, by a process known to the art, operating at temperatures of about 350–800° C. The off-gas dry HCl is at this point recycled to either a burner for conversion to chlorine or to a chloromethylation reactor or to both, as may be desirable in some cases, thus completing the chlorine recycle.

The anhydrous chromous chloride is dissolved in water under a nitrogen atmosphere, with the concentration being kept relatively high, and then passed through an anion exchange column in the sulfate form for exchange of chloride for sulfate. From this point on the chromous solutions must be kept under nitrogen or some other inert atmosphere to prevent their oxidation by air. The emergent chromous sulfate solution is then passed to the storage completing the chromium recycle.

In some instances chromous chloride may be used in the polymerization reaction instead of chromous sulfate. When this is the case the need for the anion exchange treatment is eliminated.

Many other modifications of the recycle system will occur to those skilled in the art. For example, reduction of spent chromic liquor to chromous liquor by electrolysis may be carried out at a lead cathode, using a carbon anode. With a NaCl brine solution in the anode chamber, under suitable conditions, chlorine gas may be recovered and sent to the chlorination zone to complete the chlorine recycle. Alternatively, continuous in situ regeneration of the lower valent transition metal salt is possible by maintaining an excess of reducing metal, e.g., zinc or chromium, in contact with the transition metal solution during the polymerization.

While it is preferred to carry out the process of this invention in a slurry or solution, it is also possible to omit solvents entirely and operate in such a manner that the bis-($\alpha$-haloalkyl)aromatic compound in the vapor phase reacts with the lower valence transition metal salt, used as a coupling agent, in the solid phase. For example, vapors of $\alpha,\alpha$-dichloro-p-xylene may be led, at pressures of about 0.01 mm. to 100 atm., preferably at 1 mm. to 1 atm., and at temperatures of as low as −30° C. and as high as 1000° C. but preferably at about 0–300° C. over an anhydrous lower valent transition metal salt, for example, chromous chloride, in a suitable reactor, preferably a tubular reactor fitted with a horizontally mounted stirrer. The reactor has from about $1/20$ to about $19/20$, but preferably from about $1/3$ to about $2/3$ of its volume filled with the anhydrous lower valent transition metal salt in a granular or powder form.

While the process operates without stirring, some agitation is generally preferred. As the vapors of the bis-($\alpha$-haloalkyl)aromatic compound contact the lower valent transition metal salt the $\alpha$-halo atoms are removed by the latter salt, which is simultaneously converted to the corresponding higher valent transition metal salt. Removal of the α-halogen atoms from the bis-(α-haloalkyl)aromatic compound produces a reactive intermediate of this quinodialkane type. This intermediate is stable in the vapor phase but on condensation rapidly polymerizes to the corresponding poly(arylenedialkylene) polymer. For example, when α,α-dichloro-p-xylene is led over anhydrous chromous chloride at pressures of about 0.01 mm. to 100 atm., preferably at 1 mm. to 1 atm. at temperatures of about 0–300° C. a reaction occurs and p-xylylene or p-quinodimethane is formed along with chromic chloride ($CrCl_3$). The p-xylylene is stable in the gas phase and can be condensed in cold solvents or allowed to polymerize by condensation on cool surfaces in processes known to the art.

The chromic trichloride produced, which is in anhydrous form, can in a subsequent step, or in a parallel reactor, then readily be reduced with hydrogen back to anhydrous chromous chloride at temperatures of about 300–800° C. in a process known to the art, with the production of off-gas HCl which can be recycled for use in preparing more bis-(α-haloalkyl)aromatic compounds by chloro-alkylation reactions using formaldehyde and the appropriate aromatic compound, or the HCl can be burned with air or oxygen to chloride and water, with the chlorine being recycled to produce bis-(α-haloalkyl) aromatic compounds from the appropriate dialkyl aromatic compounds.

While the vapors of the bis-(α-haloalkyl)aromatic compounds react well without the use of a carrier gas, a carrier gas may sometimes be advantageously employed. In such cases the vapors of the bis-(α-haloalkyl)aromatic compound are adjusted to partial pressures of 0.01 mm. to about 100 atm., preferably at 1 mm. to 1 atm. with total pressures ranging from about 0.1 mm. to about 200 atm., preferably from 10 mm. to 10 atm. The carrier gas must not be reactive with the bis-(α-haloalkyl)aromatic compound or with the lower valent transition metal salt. Nitrogen, argon, helium, methane, carbon dioxide and the like are preferred as carrier gases.

The invention will be more fully understood by reference to the following illustrative embodiments.

EXAMPLE I (A) *Preparation of an approximately 0.5 N aqueous chromous sulfate solution*

Aqueous solutions of chromous sulfate were prepared by the general directions of C. E. Castro (J. Am. Chem. Soc., 83, 3262 (1961)). The chromic sulfate employed as the starting material was variously formulated as $Cr_2(SO_4)_3 \cdot xH_2O$ and $Cr_2(SO_4)_3 \cdot 15H_2O$. In one preparation 55 g. of the $Cr_2(SO_4)_3 \cdot xH_2O$ in 350 ml. of water was stirred with 14.3 g. (0.22 g. atom) of zinc dust at room temperature overnight under a slow current of nitrogen. The excess zinc was separated from the blue chromous sulfate solution by filtration under nitrogen with a filter stick. The blue filtered solution was assayed by removing 1–2 cc. measured samples with a hypodermic syringe and running these out into 25 ml. portions of 0.25 M $FeCl_3$ in nitrogen-swept flasks. The resulting solutions were then titrated with standard (0.1 N) ceric ammonium sulfate solution to the green ferric-phenanthroline end point, N=0.48. Castro reported that $$N=0.71-0.75$$

By using larger proportions of chromic sulfate, concentrations of $CrSO_4$ up to 1.2 N were prepared by the same general procedure.

(B) *Conversion of α,α'-dichloro-p-xylene to poly(p-xylylene) with aqueous chromous sulfate*

Into a 500-ml. Erlenmeyer flask was placed 50 ml. of methanol. Nitrogen gas was slowly sparged through the methanol for 15 minutes to remove oxygen. Into the flask, stoppered with a rubber serum cap, was introduced by hypodermic syringe 30 ml. of clear blue $CrSO_4$ solution prepared as described above (calc. 14.5 millimoles $CrSO_4$). The resulting blue solution was homogeneous and clear. In a small serum bottle, flushed with nitrogen and capped with a serum cap, was placed 1.75 g. (10 millimoles) of α,α'-dichloro-p-xylene (M.P. 98–100° C.) and 15 ml. acetone. The resulting solution was also sparged with nitrogen for 10–15 min. and then added rapidly by hypodermic syringe to the chromous sulfate solution. An immediate color change from blue to green was observed even during the addition, accompanied by the separation of white solid. The resulting slurry was refluxed 10 min. under nitrogen, then cooled and filtered.

The while solid collected was washed well with water, boiled a few minutes in toluene to remove any unreacted α,α'-dichloro-p-xylene, again collected, washed with cold toluene and finally with acetone and dried in vacuum overnight at 50° C. 0.33 g. of white solid was obtained (32% yield). The solid was identified as poly(p-xylylene) by comparison of its infrared spectrum (KBr pellet) with a published spectrum for poly(p-xylylene) (R. A. Nyquist, "Infrared Spectra of Plastics and Resins," the Dow Chemical Co., Midland, Michigan, 2nd ed., May 3, 1961, Spectrum No. 124). A small sample of the polymer was burned on a steel spatula in an open flame and left no visible residue. The polymer softened at 200–235° C. between glass microscope cover glasses on a Fisher Scientific Co. hot stage melting point apparatus. The polymer had an inherent viscosity of 0.31, at a concentration of 0.39 g./100 ml. solvent, in benzyl benzoate at 305° C. The polymer dissolved entirely under these conditions in about 5 minutes. The viscosity was determined in a special viscometer of the type described by J. R. Schaefgen (J. Polymer Sci., 41, 133 (1959)). The viscosity determination was carried out in the manner described by Schaefgen and by T. E. Young (U.S. Patent 2,999,820).

EXAMPLE II

A three-necked, 500 ml. round-bottomed glass reaction flask was equipped with a heating mantle, a mechanical stirrer, thermometer, nitrogen inlet and reflux condenser. An oil bubbler was connected by a length of rubber hose to the top of the condenser to indicate gas flow through the system. The bubbler was disconnected while the reactants were added through the condenser. Nitrogen gas was passed through the inlet and out the condenser to remove air, and the flow was continued during the entire reaction time. When the system had been well-flushed with nitrogen, 100 ml. of methanol and 177 ml. of 0.48 N $CrSO_4$ solution (85 millimoles of $CrSO_4$) were introduced into the reaction flask by injection through the top of the condenser with a hypodermic syringe against a constant nitrogen flow. The contents of the flask were then heated to 63° C. with stirring, and a solution 6.74 g. (38.5 milliseconds) of α,α'-dichloro-p-xylene (M.P. 98–100° C.) in about 60 ml. of acetone was added dropwise over a period of 45 min. The temperature during the addition ranged from 63° to 69° C. When the addition was complete the contents of the flask were stirred and refluxed (69° C.) for an additional hour. The reaction mixture was then removed and diluted with about an equal volume of water. The solid product present was collected by filtration, washed with 5% aqueous hydrochloric acid solution, then slurried with water, collected and washed repeatedly with water. The white solid thus obtained was extracted for two hours in a Soxhlet apparatus with acetone and dried in vacuum. The dried solid weighed 2.99 g. (75% yield) and was identified as poly (p-xylylene) by means of its infrared absorption spectrum (KBr pellet) as indicated in Example I. The polymer was completely soluble within 6 minutes in benzyl benzoate at 305° C. and exhibited an inherent viscosity in that solvent at that temperature of 1.0 (0.39 g. polymer per 100 ml. solvent), determined by the method described in Example I. The polymer contained 0.59% ash.

EXAMPLE III

In a manner similar to that described in Example II, a solution of 7 g. (40 millimoles) of α,α′-dichloro-p-xylene in 56 ml. of nitrogen-sparged p-dioxane was added over a period of about one minute, with good stirring, to 111 ml. of 1.08 N aqueous chromous sulfate solution (120 millimoles of $CrSO_4$) at room temperature. A copious deposition of solid and a rapid color change from blue to green were noted almost immediately. The mixture was agitated at room temperature for two hours. Heat was then applied and the mixture was stirred and heated at 73° C. for an additional two and one-half hours. The contents of the flask were then allowed to cool and stand over the week-end under nitrogen. After dilution with two volumes of water the solid product was collected, washed with water and extracted with acetone in a Soxhlet apparatus and dried. A total of 3.88 g. (93.2% yield) of poly(p-xylylene) was obtained as a white powder. This polymer exhibited an inherent viscosity of 0.68 (0.39 g./100 ml. benzyl benzoate), determined as described in Example I. An X-ray powder diagram made with this polymer showed plane spacings occurred at 5.2, 4.5 and 3.9 Angstrom units. It is known that poly(p-xylylene) exists in two crystalline modifications: an α-form, with which plane spacings at 5.3 and 4.0 A. are associated, and a β-form, with which a spacing at 4.4 A. is associated (L. A. Errede and R. S. Gregorian, J. Polymer Sci., 60, 21 (1963)). The spacings found for the polymer of this example indicate that the crystalline portion is a mixture of the α- and β-crystalline modifications of poly(p-xylylene).

EXAMPLE IV

In a manner similar to that described in Example II, 6.0 g. (34.3 millimoles) of α,α-dichloro-p-xylene, dissolved in 48 ml. of acetone, was added rapidly at room temperature with good stirring to 80 ml. of 1.02 N aqueous $CrSO_4$ solution (81.5 millimoles $CrSO_4$). The mixture was stirred at room temperature for four hours and then allowed to stand overnight under nitrogen. The following morning the mixture was transferred to a nitrogen-filled bottle, without contact with the air, and an additional 75 ml. of 0.97 N aqueous $CrSO_4$ solution was added (72.7 millimoles $CrSO_4$). The bottle was capped and rotated at room temperature for six and one-half hours. The polymer was isolated as described in Example I and extracted in a Soxhlet apparatus with acetone and dried. A total of 0.5 g. (14%) acetone-extracted poly(p-xylylene) was obtained as a fluffy white solid. This polymer dissolved completely within about 6 minutes in benzyl benzoate at 305° C. and had an inherent viscosity of 1.87 (0.39 g./100 ml.) benzyl benzoate, determined as described in Example I, and a specific rate constant for unimolecular thermal decomposition at 305° C. of $2.7 \times 10^{-5}$ min.$^{-1}$, determined as described in U.S. Patent 2,999,820.

EXAMPLE V

In a manner similar to that described in Example II, 4.37 g. (25 millimoles) of α,α′-dichloro-p-xylene, dissolved in 60 ml. of acetone, was added at room temperature over a period of about one minute to 430 ml. of 0.58 aqueous $CrSO_4$ solution (250 millimoles of $CrSO_4$) under good agitation. A well-dispersed solid formed and the temperature rose further to 34° C. The reaction mixture was then stirred at room temperature for additional 15½ hours. The solid polymer present was collected, washed with water, reslurried with 5% aqueous hydrochloric acid solution, collected again, well-washed with water, and finally extracted in a Soxhlet apparatus with acetone, and dried. In this way, 1.75 g. (67.5%) of poly(p-xylylene) was obtained as white, resilient, coarse particles. This polymer was estimated to be 80–90% soluble in 9 minutes in Arochlor 1254 (a mixture of chlorinated aromatic hydrocarbons) at 305° C. The insoluble material stuck to the outer wall of the glass capillary tube and did not interfere with the viscosity determination. The otherwise clear light tan solution had an initial inherent viscosity of 1.64 (0.40 g. per 100 ml. solvent, assuming 100% solubility).

EXAMPLE VI

A 500-ml. three-necked, round bottom flask was equipped with a heating mantle, a mechanical stirrer, a dropping funnel and a six-inch Vigreux column attached via a simple distillation head to two 16-inch air condensers connected in tandem and slanted downward for distillation. A receiver was attached to the end of the second air condenser by means of an adapter. The Vigreux column and the distillation head were wrapped with asbestos insulation tape. The flask was also equipped with a thermocouple well and a side-port capped with a rubber serum cap through which nitrogen was introduced at the bottom of the flask by means of a curved 15 gauge hypodermic needle.

The system was well-flushed with nitrogen gas and into the flask was introduced 100 ml. of a 0.59 N aqueous $CrSO_4$ solution (59 millimoles). Heat was applied and the $CrSO_4$ solution was heated to reflux with stirring, a constant flow of nitrogen being admitted to the flask at a constant rate, as indicated by a flowmeter in the nitrogen supply line. Under these conditions water distilled but no blue color due to splattering of $CrSO_4$ passed over. By means of the addition funnel, which permitted drops to fall directly into the boiling $CrSO_4$ solution, there was added over a period of 15 minutes 4.75 g. (27 millimoles) of α,α′-dichloro-p-xylene dissolved in 15 ml. of acetone, with 5 ml. additional acetone being added to rinse the funnel. During the addition the temperature dropped to 80° C. but returned to 100° C. before the addition was completed.

During the addition a thin film of white solid formed on the inner walls of the air condensers, but after 20 minutes from the start of the addition no further build-up was detected. A white solid also collected in the receiver. After a total reaction time of 55 min. the experiment was discontinued. The reaction flask contained solid and about 25–30 ml. of green solution. This solid (solid A) was collected, washed with water and acetone and dried. The solid found in the condenser (solid B) and in the receiver (solid C) were also collected and washed with acetone to remove any α,α′-dichloro-p-xylene, and dried. All the solids A, B, and C were identified as poly(p-xylylene) by comparing their infrared absorption spectra with that of known poly(p-xylylene) (see Example I).

DISTRIBUTION OF POLY(p-XYLYLENE)

| Solid | Wt., g. | Percent Yield |
|---|---|---|
| A (flask) | 1.78 | 63.5 |
| B (condensers) | 0.049 | 1.7 |
| C (receiver) | 0.135 | 4.8 |

This embodiment provides evidence that p-xylylene monomer (3,5 - dimethylenecyclohexadiene - 1,4) is formed in the reaction of α,α′-dichloro-p-xylene with $CrSO_4$ and can be removed from the reaction zone by a carrier gas (nitrogen), to cooler parts of the system, where it polymerizes to poly(p-xylylene).

EXAMPLE VII (A) *Preparation of a 0.647 N aqueous $CrCl_2$ solution*

In the manner described by Castro (Example I) for preparation of aqueous $CrSO_4$, 33.3 g. (0.125 mole) $CrCl_3 \cdot 6H_2O$ and 6.5 (0.1 g.-atom) of zinc dust were stirred in 193 ml. distilled water for 4½ hrs. under a current of nitrogen. The resulting blue solution was separated from excess zinc by filtration and titrated as described in Example I, N=0.647.

(B) As described in Example II, 5.0 g. (28.6 millimoles) of α,α′-dichloro-p-xylene dissolved in 50 ml. of acetone was added over 25 minutes to a refluxing solution of 88.4 ml. of 0.647 N aqueous CrCl₂ (57.2 millimoles CrCl₂) in 100 ml. of methanol. An immediate color change from blue to green was noted. The mixture was heated and stirred at 68–70° C. for an additional hour after the addition of the α,α′-dichloro-p-xylene solution was complete. The reaction mixture was diluted with water and the white polymer was collected, washed with 5% HCl solution, then washed with water, and extracted 1.5 hours with acetone in a Soxhlet apparatus. 1.91 g. (64% yield) of white polymeric poly(p-xylene) was obtained, identified by its infrared absorption spectrum (Example I). This polymer had an inherent viscosity of 0.19, determined as described in Example I.

EXAMPLE VIII

In a manner similar to that described in Example II, 6.00 g. (34 millimoles) of α,α′-dichloro-p-xylene and 2.25 g. (8.5 millimoles) of α,α′-dibromo-o-xylene dissolved in 50 ml. acetone were added over 40 min. to a mixture of 113 ml. of 1.13 N aqueous CrSO₄ (128 millimoles CrSO₄) and 63 ml. of p-dioxane. The contents of the flask were stirred and heated to 50° C. over a period of 15 min., held at 50° C. for 2 hours and then heated to reflux at 73° C. over ½ hr., and finally held at reflux for 2 hours. The contents of the flask were then diluted with water and the solid product was collected, washed with water, slurried with 5% HCl solution, again collected, reslurried with hot water, collected, washed well with water and finally extracted 2 hours with acetone in a Soxhlet apparatus and dried. 3.54 g. of a very faintly green solid was obtained (79.5% yield). This polymer had an inherent viscosity of 0.25 in benzyl benzoate at 305° C. (0.39 g./100 ml. benzyl benzoate) determined as described in Example I. The infrared absorption spectrum showed a strong band at 823 cm.⁻¹ and a medium intensity band at 753 cm.⁻¹ confirming the presence of p- and o-disubstituted benzene rings, respectively, in the polymer chain. The polymer softened from 235° up to 305° C. The X-ray diffraction pattern showed lines as follows: 5.34(s), 5.10(w), 3.96(s), 3.68(w), 3.04(vw), and 2.85A.(vw).

EXAMPLE IX

In a manner similar to that described in Example II, a solution of 4.5 g. (25.7 millimoles) of α,α′-dichloro-p-xylene and 2.01 g. (8.5 millimoles) of 2,5-bis(chloromethyl)-1,4-dimethoxybenzene (prepared by the method of J. H. Wood and R. E. Gibson, J. Am. Chem. Soc., 71, 393 (1949)), in 137 ml. p-dioxane was added to 91 ml. 1.13 N CrSO₄ (103 millimole CrSO₄) over a period of 30 minutes at room temperature with good agitation. After 3½ hours the contents of the flasks were heated to 80° C. over 30 minutes and then maintained for 2¼ hrs. at 80–87° C. The final reaction mixture was diluted with water. The solid polymer present was collected, washed well with water and extracted in a Soxhlet apparatus for 2 hours with acetone. A white copolymeric product was obtained in the amount of 2.55 g. (62.6% yield). The polymer had an inherent viscosity of 0.56 measured in benzyl benzoate at 305° C. (0.39 g./100 ml. benzyl benzoate) determined as described in Example I. The infrared absorption spectrum for this copolymer showed a strong absorption for p-disubstituted benzene nuclei at 823 cm.⁻¹, as well as a strong band at 1210 cm.⁻¹ for a methoxy group attached to an aromatic nucleus and a weak to medium band for isolated ring protons at 857 cm.⁻¹. These absorptions are in accord with either a copolymer of p-xylylene and 2,5-dimethoxy-p-xylylene or simply a homopolymer of 2,5-dimethoxy-p-xylylene. However, the maximum amount of poly(2,5-dimethoxy-p-xylylene) obtainable from the amount 2,5-bis-(chloromethyl)-1,4-dimethoxy-benzene charged would only be 1.4 g., an amount well below the 2.55 g. of product actually obtained.

The X-ray diffraction pattern showed lines as follows: 5.34(m), 4.97(w), 4.48(m), 3.95(w), 3.36(vw), 3.03 (vw) and 2.81 A. (vw).

The above data show that the polymerization process of this invention may be effectively employed to prepare various poly(arylenedialkylene) polymers. As a result of the relatively mild conditions which are used in the process, many substituents sensitive to heat and the action of the strong coupling agents disclosed in the prior art, may be present in the divalent aromatic radical, Ar, in the recurring unit —Cr₁R₂ArCR₃R₄— or may comprise the radicals R₁, R₂, R₃ or R₄, as above defined. As previously discussed, the presence of such substituents would lead to undesirable results in polymerization processes such as pyrolysis and the use of strong coupling agents.

While particular embodiments of this invention are shown above, it will be understood that the invention is obviously subject to variations and modifications without departing from its broader aspects.

What is claimed is:

1. A polymerization process which comprises reacting at least one bis-(α-haloalkyl)aromatic compound capable of polymerization, having the formula

X—CR₁R₂ArCR₃R₄—X′ wherein X and X′ are selected from the group consisting of chlorine, bromine, iodine, fluorine and mixtures thereof R₁, R₂, R₃ and R₄ are selected from the group consisting of hydrogen, fluorine, lower alkyl groups having from 1 to 3 carbon atoms, aryl groups having from 6 to 10 carbon atoms, and mixtures thereof Ar is an aromatic substituent selected from the group consisting of arenes, aromatic heterocyclics, and fused ring aromatics, with a lower valent transition metal salt at a temperature within the range of about −30° to 300° C.

2. A polymerization process which comprises adding a solution of at least one bis-(haloalkyl)arene, capable of polymerization, having the formula

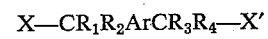
X—CR₁R₂ArCR₃R₄—X′ wherein X and X′ are selected from the group consisting of chlorine, bromine, iodine, fluorine and mixtures thereof R₁, R₂, R₃ and R₄ are selected from the group consisting of hydrogen, fluorine, lower alkyl group having from 1 to 3 carbon atoms, aryl groups having from 6 to 10 carbon atoms, and mixtures thereof Ar is a divalent arene radical, to a hydroxylic solution of a lower valent transition metal salt, to effect polymerization of said bis-(α-haloalkyl)arene at a temperature within the range of about −30° to 300° C. under an inert atmosphere and a pressure within the range of about 1 to 1000 p.s.i.a., and recovering the polymer product from the resulting reaction product mixture.

3. The process of claim 2 wherein said bis-(α-haloalkyl)arene is α,α′-dichloro-p-xylene.

4. The process of claim 2 wherein said bis-(α-haloalkyl)arene is α′-α′-dibromo-o-xylene.

5. The process of claim 2 wherein said bis-(α-haloalkyl)arene is 1,4-bis-(α-chloroisopropyl)benzene.

6. The process of claim 2 wherein said bis-(α-haloalkyl)arene is bis(chloromethyl)durene.

7. The process of claim 2 wherein said bis-(α-haloalkyl)arene is α,α′,2,3,5,6-hexachloro-p-xylene.

8. The process of claim 2 wherein said bis-(α-haloalkyl)arene is an admixture of α,α′-dichloro-p-xylene and α,α′-dibromo-o-xylene.

9. The process of claim 2 wherein said bis-(haloalkyl)arene is 2,5-bis-(chloromethyl)-1,4-dimethoxybenzene.

10. The process of claim 2 wherein said bis-(haloalkyl)arene is 1,4-bis-(chloromethyl)naphthalene.

11. The process of claim 2 wherein said bis-(haloalkyl)arene is dissolved in acetone.

12. The process of claim 2 wherein said hydroxylic solvent is selected from the group consisting of water, methanol, ethanol, n-propanol, isopropanol, ethylene glycol, and mixtures thereof.

13. The process of claim 2 wherein said lower valent transition metal salt is chromous sulfate.

14. The process of claim 2 wherein said lower valent transition metal salt is chromous chloride.

15. The process of claim 2 wherein said inert atmosphere is nitrogen.

16. The process of claim 2 wherein said temperature is within the range of about 0° to 100° C.

17. A polymerization process which comprises polymerizing a solution of $\alpha,\alpha'$-dichloro-p-xylene in acetone in the presence of an aqueous solution of chromous sulfate under an inert atmosphere at a temperature within the range of about 0° to 100° C. and a pressure of about 1 to 1000 p.s.i.a.

References Cited

UNITED STATES PATENTS 3,265,640   8/1966   Overhults et al. _____ 260—2

JOSEPH L. SCHOFER, *Primary Examiner.*

H. WONG, *Assistant Examiner.*